US010212288B2

(12) United States Patent
Nikeyenkov

(10) Patent No.: US 10,212,288 B2
(45) Date of Patent: Feb. 19, 2019

(54) METHOD FOR CONVERGING TELEPHONE NUMBER AND IP ADDRESS

(71) Applicant: Genesys Telecommunications Laboratories, Inc., Daly City, CA (US)

(72) Inventor: Leonid V. Nikeyenkov, San Francisco, CA (US)

( * ) Notice: Subject to any disclaimer, the term of this patent is extended or adjusted under 35 U.S.C. 154(b) by 13 days.

(21) Appl. No.: 14/340,481

(22) Filed: Jul. 24, 2014

(65) Prior Publication Data
US 2014/0334482 A1 Nov. 13, 2014

Related U.S. Application Data

(62) Division of application No. 13/424,988, filed on Mar. 20, 2012, now abandoned.

(51) Int. Cl.
*H04M 7/00* (2006.01)
*H04L 29/12* (2006.01)

(52) U.S. Cl.
CPC ........ *H04M 7/0075* (2013.01); *H04L 61/157* (2013.01); *H04L 61/1511* (2013.01); *H04L 61/303* (2013.01); *H04L 61/605* (2013.01); *H04M 2207/203* (2013.01)

(58) Field of Classification Search
CPC ........... H04L 65/1069; H04L 29/06027; H04L 61/157; H04L 61/605; H04L 69/167; H04L 29/12066; H04L 29/1216; H04L 29/12896; H04L 29/12915; H04L 61/6059; H04M 2207/203; H04M 7/0075; H04M 7/006
See application file for complete search history.

(56) References Cited

U.S. PATENT DOCUMENTS 6,016,393 A * 1/2000 White .................... G06F 9/465
                                                   719/315
6,330,239 B1   12/2001 Suzuki
7,184,430 B2    2/2007 Schessel
(Continued)

OTHER PUBLICATIONS

Deering, S. et al. Internet Protocol Version 6 (IPv6) Specification, Network Working Group Request for Comments 2460, Dec. 1998, 39 pages.
(Continued)

*Primary Examiner* — Mansour Oveissi

(57) ABSTRACT

A method for converging telephone numbers and Idata addresses follows the steps of (a) accessing from a first memory location of a communication appliance one of an E.164 telephone number or an IPv6 address; (b) using the E.164 criteria of [Country Code-Identification Code-Subscriber Number 1-Subscriber Number 2-Extension-Ext2-Ext3] for a telephone number, converting that number to an IPv6 hexadecimal notation IP address in the format [<Country Code>:<Identification Code>:<Subscriber Number 1>:<Subscriber Number 2>:[<Extension>]:[<Ext2>: [<Ext3>]], and converting in the reverse for an IP address to a telephone number; (c) storing the telephone number or address in a separate memory location of the appliance; and (d) depending on the nature of a communication session initiated by a user, retrieving the appropriate IP address or telephone number as the destination for the communication.

20 Claims, 2 Drawing Sheets

(56) References Cited

U.S. PATENT DOCUMENTS

| | | | |
|---|---|---|---|
| 2002/0069254 A1* | 6/2002 | Watanabe | H04L 51/28 |
| | | | 709/206 |
| 2002/0083198 A1 | 6/2002 | Kim et al. | |
| 2002/0136387 A1 | 9/2002 | Choi et al. | |
| 2004/0218747 A1 | 11/2004 | Ranalli et al. | |
| 2005/0286695 A1 | 12/2005 | Pershan et al. | |
| 2007/0255799 A1* | 11/2007 | Forbes | G06F 17/30876 |
| | | | 709/217 |
| 2008/0189437 A1* | 8/2008 | Halley | H04L 12/14 |
| | | | 709/245 |
| 2011/0055555 A1* | 3/2011 | Michaelis | G06F 21/10 |
| | | | 713/156 |
| 2011/0142035 A1 | 6/2011 | Ku et al. | |
| 2012/0008760 A1* | 1/2012 | Berkowitz | H04Q 3/66 |
| | | | 379/221.14 |
| 2013/0250937 A1 | 9/2013 | Nikeyenkov | |

OTHER PUBLICATIONS

International Search Report and Written Opinion for PCT/US2013/33024, dated May 31, 2013, 8 pages.
Unknown author, the international public telecommunication numbering plan, Telecommunication Standardization Sector of ITU, Series E: Overall Network Operation, Telephone Service, Service Operation and Human Factors, International operation—Numbering plan of the international telephone service, ITU-T, E.164, Nov. 2010, pp. i-23.

* cited by examiner

METHOD FOR CONVERGING TELEPHONE NUMBER AND IP ADDRESS

CROSS-REFERENCE TO RELATED APPLICATIONS

This application is a divisional of U.S. patent application Ser. No. 13/424,988, filed on Mar. 20, 2012, the disclosure of which is hereby incorporated by reference in its entirety.

BACKGROUND OF THE INVENTION

1. Field of the Invention

The present invention is in the technical field of telephonic communication systems, and pertains more particularly to a system and method for associating a telephone number with an IP address.

2. Description of Related Art

A system to accomplish a similar result to that of the present invention is "ENUM", which accomplishes telephone number mapping, but relies on complicated technology, using Domain Name System (DNS). It has occurred to the present inventor that the mapping may be done in a more straightforward manner using IP-forwarding.

BRIEF SUMMARY OF THE INVENTION

Recognizing a need for a simplified and elegant process and hardware for converging telephone numbers, particularly E.164 format numbers, to IP addresses, particularly IPv6 addresses, the present inventor has provided a method for converging E.164 telephone numbers and IPv6 data addresses, comprising the steps of (a) using a computerized appliance enabled to place voice calls and to send IP-addresses messages and data, accessing from a first memory location of the appliance one of an E.164 telephone number or an IPv6 address; (b) using the E.164 criteria of [Country Code-Identification Code-Subscriber Number 1-Subscriber Number 2-Extension-Ext2-Ext3] for a telephone number, converting that number to an IPv6 hexadecimal notation IP address in the format [<Country Code>:<Identification Code>:<Subscriber Number 1>:<Subscriber Number 2>: [<Extension>]:[<Ext2>:[<Ext3>]], and converting in the reverse for an IP address to a telephone number; (c) storing the resulting telephone number or IPv6 IP address in a separate memory location of the appliance; and (d) depending on the nature of a communication session initiated by a user of the appliance retrieving the appropriate IP address or telephone number as the destination for the communication.

In one embodiment of the invention, in mapping an E.164 telephone number to an IPv6 IP address, inserting a leading common nibble into the IP address as a standardization identifier. Also in one embodiment, in mapping an IPv6 IP address to a telephone number, any leading nibble not recognized as a part of a telephone number is dropped in the mapping.

In another aspect a method for directing a communication session at a computerized appliance coupled to the Internet network is provided, comprising the steps of (a) determining the final destination of the communication session, and the nature of an end-point appliance to which the session is directed; (b) if the communication session is a data communication session associated with an IPv6 address and the determined end destination is a PSTN telephone, changing the destination address from IP to E.164 using the mapping [<Country Code>:<Identification Code>:<Subscriber Number 1>:<Subscriber Number 2>:[<Extension>]:[<Ext2>: [<Ext3>]] to [Country Code-Identification Code-Subscriber Number 1-Subscriber Number 2-Extension-Ext2-Ext3]; (c) if the communication session is a PSTN session using an E.164 telephone number and the final destination requires an IP address, changing the destination address from E.164 to IPv6 using the mapping [Country Code-Identification Code-Subscriber Number 1-Subscriber Number 2-Extension-Ext2-Ext3] to [<Country Code>:<Identification Code>: <Subscriber Number 1>:<Subscriber Number 2>: [<Extension>]:[<Ext2>:[<Ext3>]]; and (c) connecting the session to the final destination.

In one embodiment of this method, in mapping an E.164 telephone number to an IPv6 IP address, a leading common nibble is inserted into the IP address as a standardization identifier. Also in one embodiment, in mapping an IPv6 IP address to a telephone number, any leading nibble not recognized as a part of a telephone number is dropped in the mapping.

In another aspect of the invention an endpoint communication device is provided comprising an I/O interface for user operation, a coupled memory device comprising contact data and addresses, and computer instructions executable for operating the device. The device through the computer instructions converts E.164 telephone numbers from one memory location to IPv6 addresses and stores same in another memory location, using mapping of [Country Code-Identification Code-Subscriber Number 1-Subscriber Number 2-Extension-Ext2-Ext3] to [<Country Code>:<Identification Code>:<Subscriber Number 1>:<Subscriber Number 2>:[<Extension>]:[<Ext2>:[<Ext3>]], and converts IPv6 addresses to E.164 telephone numbers and stores same in other memory locations using mapping of [<Country Code>:<Identification Code>:<Subscriber Number 1>:<Subscriber Number 2>:[<Extension>]:[<Ext2>: [<Ext3>]] to [Country Code-Identification Code-Subscriber Number 1-Subscriber Number 2-Extension-Ext2-Ext3], and depending on the nature of a communication session initiated by a user of the device retrieves the appropriate IP address or telephone number as the destination for the communication.

In one embodiment of this device, in mapping an E.164 telephone number to an IPv6 IP address, a leading common nibble is inserted into the IP address as a standardization identifier. Also in one embodiment, in mapping an IPv6 IP address to a telephone number, any leading nibble not recognized as a part of a telephone number is dropped in the mapping.

In yet another aspect of the invention a computerized device is provided comprising a port to a PSTN network, a port to a data network, a coupled memory device comprising contact data and addresses; and computer instructions executable for operating the device. The device, receiving a communication session determines the final destination of the communication session, and the nature of an end-point appliance to which the session is directed, and if the communication session is a data communication session associated with an IPv6 address and the determined end destination is a PSTN telephone, changes the destination address from IP to E.164 using the mapping [<Country Code>: <Identification Code>:<Subscriber Number 1>:<Subscriber Number 2>:[<Extension>]:[<Ext2>:[<Ext3>]] to [Country Code-Identification Code-Subscriber Number 1-Subscriber Number 2-Extension-Ext2-Ext3], and if the communication session is a PSTN session using an E.164 telephone number and the final destination requires an IP address, changes the destination address from E.164 to IPv6 using the mapping [Country Code-Identification Code-Subscriber Number 1-Subscriber Number 2-Extension-Ext2-Ext3] to [<Country Code>:<Identification Code>:<Subscriber Number 1>:<Subscriber Number 2>:<Extension>]:[<Ext2>: [<Ext3>]]; and connects the session to the final destination.

In this aspect, in mapping an E.164 telephone number to an IPv6 IP address, a leading common nibble is inserted into the IP address as a standardization identifier. Also in this aspect, in mapping an IPv6 IP address to a telephone number, any leading nibble not recognized as a part of a telephone number is dropped in the mapping.

DETAILED DESCRIPTION OF THE INVENTION

Figure 1:
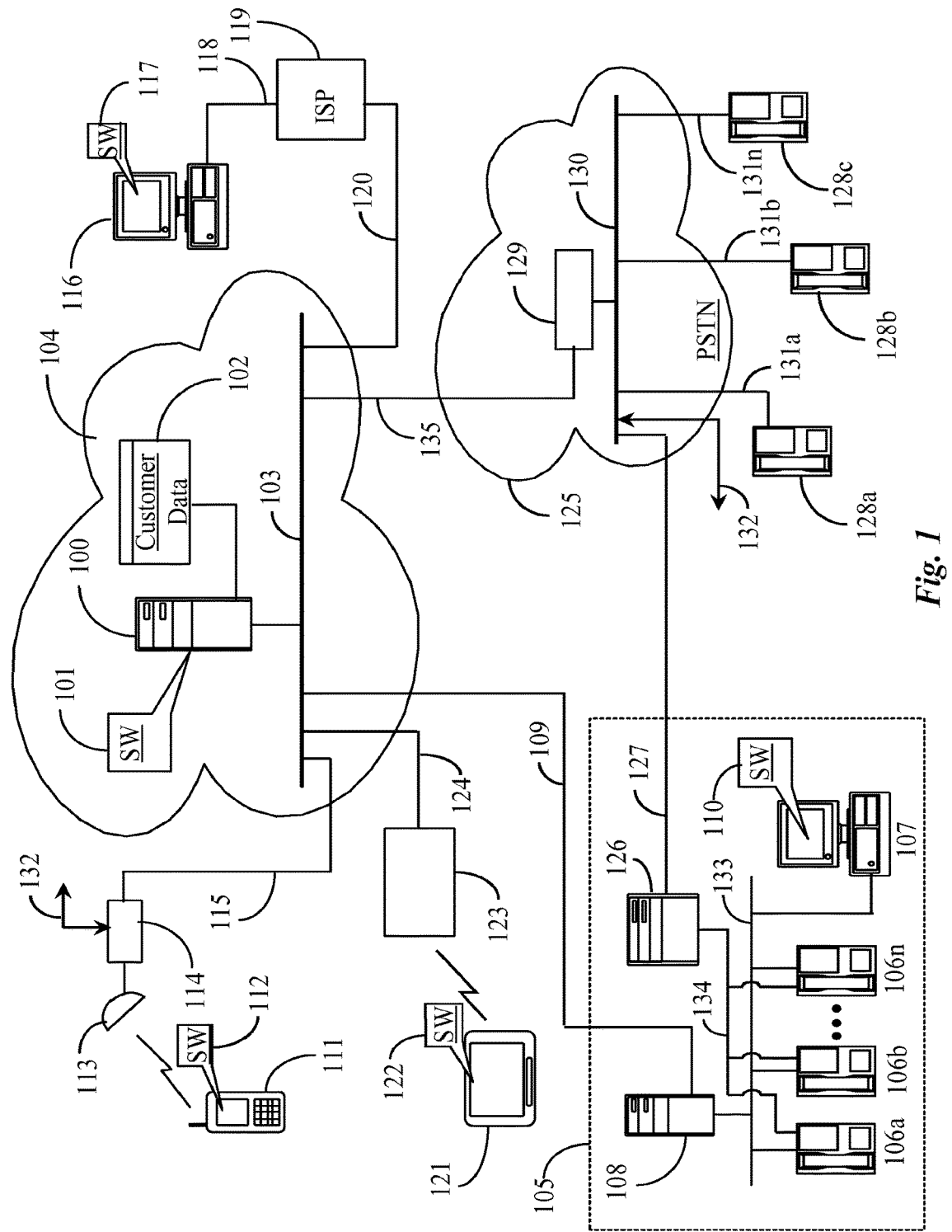
FIG. 1 is an architectural diagram illustrating integrated communication networks in which embodiments of the present invention may be practiced.

The essence of the present invention in one embodiment is to converge the E.164 standard for telephony number presentation into IPv6 format in order to allow seamless voice (telephony) and data (internet) access in areas of person-to-person communication and service in various applications including but not limited to service centers such as call centers, billing system, and so forth. The inventor refers to the system as convergence.

It is well-known in the at that telephones, both landline and cellular are addressed by telephone numbers, and that there is a widely-used standard for such telephone numbers, known as the E.164 standard, which is a standard coordinated by the International Telecommunications Union (ITU). E.164 defines the international public telecommunication numbering plan used in the Public Switched Telephone Network (PSTN) and some other data networks. E.164 numbers can have a maximum of fifteen digits and are usually written with a + prefix. To actually dial such numbers from a normal fixed line phone, the appropriate international call prefix must be used. The full detail of the E.164 standard is available to the skilled person at least at the standards bureau through their website at www.itu.int/.

It is further well-known in the art to address data systems on networks, such as the well-known Internet network, by Internet Protocol (IP) addresses. An Internet Protocol address (IP address) is a numerical label assigned to each device (e.g., computer, printer, smart phone, computerized pad device) participating in a computer network that uses the Internet Protocol for communication An IP address serves two principal functions: host or network interface identification and location addressing. Its role has been characterized as follows: "A name indicates what we seek. An address indicates where it is. A route indicates how to get there.

The designers of the Internet Protocol defined an IP address as a 32-bit binary number, and this system, known as Internet Protocol Version 4 (IPv4), is still in use today. However, due to the enormous growth of the Internet and predicted depletion of available addresses, a new addressing system known as (IPv6), using 128 binary bits for the address, was developed in 1995, standardized as RFC 2460 in 1998, and is being deployed worldwide since the mid-2000s.

IP addresses are usually stored in text files and often are displayed in human-readable notations, such as 172.16.254.1 (for IPv4), and 2001:db8:0:1234:0:567:8:1 (hexadecimal notation for IPv6). The Internet Assigned Numbers Authority (IRNA) manages the IP address space allocations globally and delegates five regional Internet registries (RIRs) to allocate IP address blocks to local Internet registries (Internet service providers) and other entities that have use for them.

It was stated in the background section above that there is a conventional system for associating telephone numbers with IPO addresses (telephone number mapping), and that system is the ENUM standard, which uses special DNS record types to associate a telephone number with an Ipv4 address.

Being able to dial telephone calls the way customers have come to expect is considered crucial for the convergence of classic telephone service (PSTN) and Internet telephony (VoIP), and for the development of new IP multimedia services. The problem of a single universal personal identifier for multiple communication services can be solved with different approaches. One simple approach is the Electronic Number Mapping System ENUM (also known as Telephone Number Mapping), developed by the IETF, using existing E.164 telephone numbers, protocols and infrastructure to indirectly access different services available under a single personal identifier. ENUM also permits connecting the IP world to the telephone system in a seamless manner.

Firstly, to have the advantages of the ENUM system one must subscribe, and for an ENUM subscriber to be able to activate and use the ENUM service the subscriber needs to obtain three elements from a Registrar:

(1) A personal Uniform Resource Identifier (URI) to be used on the IP part of the network, as explained below.

(2) One E.164 regular personal telephone number associated with the personal URI, to be used on the PSTN part of the network.

(3) Authority to write his call forwarding/termination preferences in the NAPTR record accessible via the personal URI.

This works for ENUM as follows: (1) the Registrar provides the Subscriber (or Registrant) with a domain name, the URI, that will be used for accessing a DNS server to fetch a NAPTR record, (2) a personal E.164 telephone number (the ENUM number). The URI domain name of (1) is biunivocally associated (one-to-one mapped) to the subscriber E.164 ENUM number of (2). Finally (3) the Naming Authority Pointer Resource Records (NAPTR) record corresponding to the subscriber URI contains subscriber call forwarding/termination preferences.

Therefore, if a calling party being at the PSTN network dials a called party ENUM number by touch typing the E.164 called party number, the number will be translated at the ENUM gateway into the corresponding URI. This URI is then used for looking-up and fetching the NAPTR record reciting how the called party wishes about how the call should be forwarded or terminated (either on IP or on PSTN terminations)—the so-called access information—which the registrant (the called party) has specified by writing his/her choice at the NAPTR record, such as e-mail addresses, a fax number, a personal website, a VoIP number, mobile telephone numbers, voice mail systems, IP-telephony addresses, web pages, GPS coordinates, call diversions or instant messaging. Alternatively, when the calling party is at the IP side, the User Agent (UA) piece of software of the dialer will allow to dial a E.164 number, but the dialer UA will convert it into a URI, to be used for looking-up at the ENUM gateway DNS and fetch the NAPTR record obtaining the called party designations about how the call should be forwarded or terminated (again, either on IP or on PSTN terminations).

ENUM is a personal number, meant to be valid for the registrant's lifetime. Consequently in ENUM once the operator number holder assigns a number to a registrant, the number belongs to that registrant during his/her entire lifetime. If the registrant wishes to change his initial number holder operator (that might also coincide being his gateway operator) there have to be provisions for the ENUM number to be ported from the initial operator to other number holder operators.

Calling by using a new personal E.164 number (the ENUM number) to look-up at a database is therefore an indirect calling support service, and this fact is an important issue in the present invention.

In embodiments of the present invention an E.164 telephone number is mapped directly into IPv6 format in order to allow seamless voice (telephony) and data (Internet) communication and data transfer in areas of (1) person to person communication, and (2) service in various applications including but not limited to service centers such as call center, billing system, and so on. The inventor terms this unique process direct convergence.

It was described above that the IPv6 standard expresses IP addresses as 128 bit binary numbers, which are conventionally expressed as nibbles in hexadecimal notation. According to E.164, "Country Code, Identification Code (Area Code,) and Subscriber Number" total to 15 digits, so 4 quartets (hexadecimal nibbles) provide sufficient space for mapping the E.164 telephone number as a hexadecimal notation IPv6 IP address. "Subscriber Number" may go from 0 to 11 digits and should overflow left to "Identification Code" if longer than 8 digits. Subsequently, if there is not enough space, "Identification Code" may overflow left to <Country Code>. <Extension> is optional. If Extension is longer than 4 digits it overflows right to Ext2 and Ext3 up to 12 digits total.

To operate in a practical sense the direct convergence system in embodiments of the invention must have an identity, and therefore requires a common quartet, or nibble, in the hexadecimal notation. The inventor in examples herein uses CA11 as a first quartet in a direct convergence notation of an IPv6 address associated directly with a E.164 telephone number. The mapping then proceeds as: CA11: <Country Code>:<Identification Code>:<Subscriber Number 1>:<Subscriber Number 2>:[<Extension>]:[<Ext2>: [<Ext3>]]. It will be apparent to the skilled person, however, that the identity may be established by just about any common characteristic. The starting nibble of CA11 is just one way of establishing the nature of the address.

As a specific example in an embodiment of the invention the telephone number +1 650 555 4242 is an IPv6 address CA11:1:650:555:4242:: DNS is not required. This mapping results in a fixed IP, but it may be forwarded to a dynamically assigned IP address.

One advantage of the convergence in embodiments of the invention is that people are familiar with memorizing 7 or 8 digits phone numbers and default to local area and country codes, while long internet domain names sometimes are harder to remember than a friend's cell phone. Another advantage is that convergence according to the present invention allows using different channels (voice, internet, digital media) to be accessed using single address and based on overlapping transmitter/receiver capabilities.

FIG. 1 is an architectural diagram illustrating integrated communication networks in which embodiments of the present invention may be practiced. In FIG. 1 cloud 104 represents the Internet network and pat5h 103 represents all of the many interconnections in the Internet. A server 100 is shown, which provides certain functionality in some embodiments of the present invention, described further below. Server 100 executes software 101 which provide all of the instructional functions of the server, and there is a couple data repository 102 which may store subscriber information and other information as well.

Smart phone 111 is illustrated as executing software 112 and communicating wirelessly in a cellular network to a station 114 which connects to Internet backbone 103 via path 115. Station 114 further connects to PSTN network 125 via phone trunk 132. Smart phone 11 may thus establish voice transactions by VoIP through Internet 104 and PSTN calls through PSTN 125. Smart phone 11 may also establish data communication for such as email and text messaging through station 114 and Internet 104.

A computerized appliance 116 is shown executing software 117 connected by path 118 to an Internet Service Provider (ISP) 119, hence to Internet 104 via path 120. Appliance 116 may establish VoIP voice communication through the Internet and data communication as well.

A computerized pad device 121 is illustrated executing software 122 communicating with Internet 104 via a WIFI system 123 and path 124. Device 121 may establish voice and data communication via Internet 104.

A business operation, which may be a call center, is illustrated as element 105, comprising stations having telephones 106a through 106n which may be operable through local area network (LAN) 133. A server 108 connected to LAN 133 manages data voice calls through Internet 104 via path 109 and data transactions as well. There is also illustrated a computer appliance 107 executing software 110 connected to LAN 133 for data communication, which may also comprise data voice calls. Further center 105 comprises a PSTN switch 126 connected to PSTN 125 and to telephones 106a to 106n by internal telephone lines 134.

Further to the above PSTN 125 comprises a backbone 130 representing all of the interconnecting lines in the PSTN, and at least one service control point (SCP) 129 which is connected to Internet backbone 103 by path 135 as well as to PSTN devices. Telephones 128a through 128n represent telephones that may be connected to the PSTN by various means known in the art.

The skilled person will understand that the abstract diagram FIG. 1 is far from detailed and complete in terms of all the end-point devices, networks and interfaces and gateways that may be present in the interconnected communication systems in the art. Nevertheless FIG. 1 does illustrate the general nature of the overall interconnected communication structure, and is provided for the purpose of aiding in description of application of embodiments of the present invention.

Figure 2:
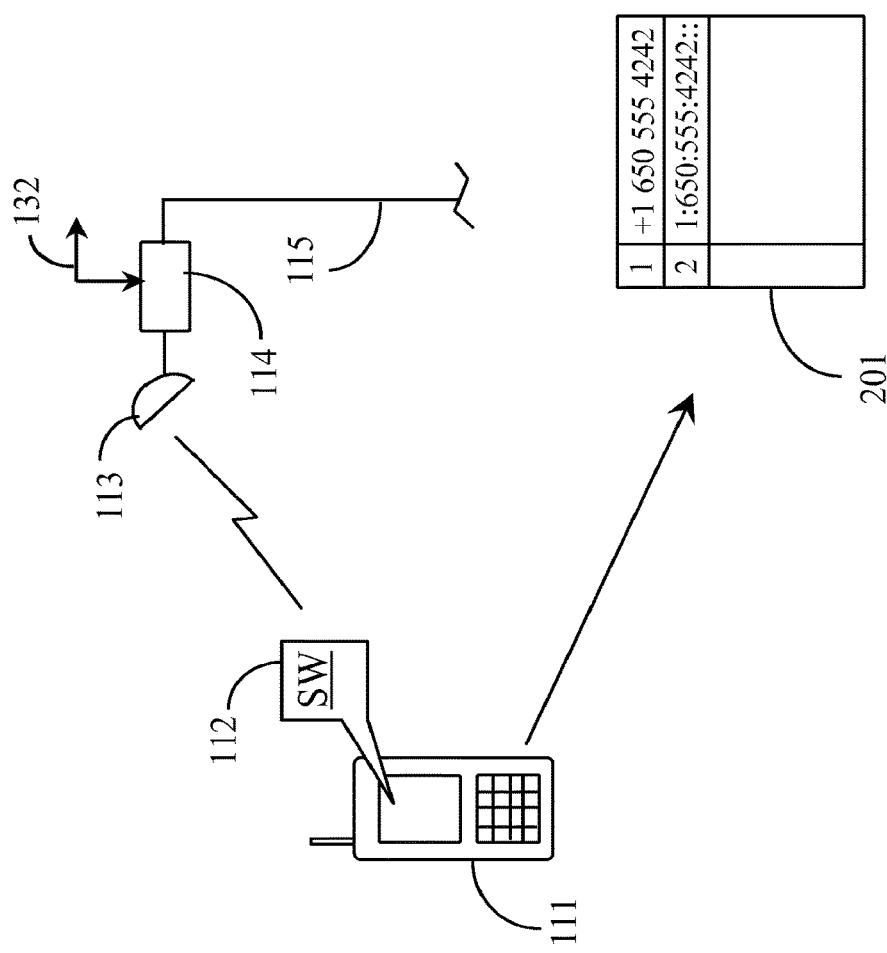
FIG. 2 is an expanded illustration of smart telephone 111 from FIG. 1 which executes software 112.

FIG. 2 is an expanded illustration of smart telephone 111 from FIG. 1 which executes software 112. Element 201 is a memory device in telephone 111 with line 1 representing one memory location and line two representing another memory location. In one embodiment of the invention when a user enters a telephone number for a contact, such as E.164 number +1-650-555-4242, software 112 causes that number to be stored in memory location 1, to be accessible for establishing a voice call with the contact associated with the telephone number. The number may be a PSTN number or alternatively a cellular telephone number. In this embodiment of the invention software 112 has an algorithm and instructions for causing telephone number +1-650-555-4242 to be converted to an IPv6 IP address 1:650:555:4242:: and to be stored in memory location 2. Now a user may select a communication protocol, such a voice call or a text message, for example, and telephone 111 will retrieve the appropriate telephone number or IP address to initiate the communication or messaging session. There is no need to establish a data link and query DNS for a URI to associate with an appropriate IP address.

In alternative embodiments software 112 may do the needed conversion at the time of entry of an IP address or a telephone number for a contact, or may do the conversion as needed at the time of establishing a communication session.

The skilled person will recognize that there is no common nibble, such as CA11 described above in the description thus far made for operation of smart telephone 111. It will be apparent that if all IP addresses are limited to this protocolso9 there is universal convergence of telephone numbers and IP addresses there is no need for the common nibble. It is unlikely, however, that the protocol established in the present invention will be instantly adopted and universally deployed to the exclusion of all alternatives.

In the more likely scenario that an embodiment of the present invention may be deployed initially on a limited basis, then a common nibble may be used, such as CA11 as described above as a leading nibble. There is no strict requirement, however, for the placement or for the numerical value of this common nibble. Leading is convenient because the common nibble will be read first and may be used for switching functionality.

In one embodiment of the invention in which a common nibble is used, such as leading CA11, a user of and end-point appliance may be responsible for entering contact addresses and phone numbers in a fashion that those contacts that are known to conform to the convergence functionality of this invention may be treated as such, and other contacts differently by software 112 of the telephone 111. Further, provision may be made for pinging an Internet site 100, executing software 101, for checking subscriber data in data repository 102 to ascertain conformity to the convergence scheme. IN this case, for example, if a user were to select the contact with telephone number in memory location 1, and send a text message using the IP address from memory location 2, and the server 100 returns that the address is not valid, the software at 11 would notify the sender, and the text message would not be sent.

The conversion from a telephone number to an IPv6 address or the reverse in various embodiments of the present invention may be made in a variety of different locations in the interconnected networks of FIG. 1 and by a variety of different devices using hardware and functionality compatible with embodiments of the present invention. For example, let us presume that computerized appliance 116 were to place a data telephony call to a PSTN land-line telephone. Device 116 may place the data voice call asserting IP address 1:650:555:4242:: through Internet 104 and the call may be translated at SCP 129 to PSTN number +1-650-555-4242 and connected to the appropriate land-line telephone number using the simple transformation described in the specification without having to access other data repository or look-up tables.

Similar functionality in the invention may be implemented at server 108 in call center 105, at PSTN switch 126 in call center 105, in end device 121 at telephones 106*a* to 106*n*, at appliance 107 in call center 105, and at many other locations in the integrated networks for seamless convergence of voice and data messaging and transfer of multimedia files and the like from endpoint to endpoint.

The skilled person will recognize that the specific examples described above are not in themselves limiting, as they are simply examples of many ways in which the invention may be implemented and practiced The invention is limited only by the claims that follow.

The invention claimed is:

1. A method for converging E.164 telephone numbers and IPv6 data addresses, comprising:
   receiving, by a processor, in a user computerized appliance operated by a user, a received one of a telephone number and an IP address, where the user computerized appliance operated by the user is configured to place voice calls and send IP address data messages;
   automatically converting, by the processor in the user computerized appliance operated by the user, the received one of the telephone number and the IP address to a converted one of a telephone number and an IP address in accordance with a publicly defined protocol standard without querying an external system for the conversion, where the converted one is directly mapped from a telephone number format to an IP address format if the received one is a telephone number and the converted one is directly mapped from an IP address format to a telephone number format if the received one is an IP address;
   receiving, by the processor, in the user computerized appliance operated by the user, a user selection of a communication protocol from among a plurality of communication protocols, where a first type of communication protocol from among the plurality of communication protocols corresponds to a telephone number and a second type of communication protocol from among the plurality of communication protocols corresponds to the IP address;
   if the user selection is the first type of communication protocol, initiating, by the processor, in the user computerized appliance operated by the user, the first type of communication protocol using the telephone number; and
   if the user selection is the second type of communication protocol, initiating, by the processor, in the user computerized appliance operated by the user, the second type of communication protocol using the IP address.

2. The method of claim 1 further comprising:
   storing, by the processor, the telephone number by the user computerized appliance operated by the user, in a first memory location; and
   storing, by the processor, the IP address by the user computerized appliance operated by the user, in a second memory location.

3. The method of claim 1, wherein the second type of communication protocol is a data communication protocol including a text message.

4. The method of claim 3, wherein the user selection is selection of a communication protocol.

5. The method of claim 4, wherein the user selection includes a selection of the IP address.

6. The method of claim 1, wherein the second type of communication protocol is a voice-over-IP call.

7. The method of claim 1, wherein the external system is an external domain name server.

8. The method of claim 1, wherein the telephone number is associated with a plurality of fields provided by the publicly defined protocol standard, wherein the converting includes converting the numbers associated with each field into a hexadecimal notation.

9. The method of claim 8, wherein converting includes inserting a leading standardization identifier to the IP address.

10. The method of claim 8, where the method further includes removing a leading nibble of the converted IP address if the leading nibble does not correspond to a part of a telephone number.

11. The user computerized appliance operated by the user of claim 1, wherein the external system is an external domain name server.

12. A user computerized appliance operated by a user and configured to place voice calls and send IP address data messages, the user computerized appliance operated by the user comprising:

at least one processor; and memory, wherein the memory stores instructions that, when executed by the processor, cause the processor to:

receive in a user computerized appliance operated by a user a received one of a telephone number and an IP address, where the user computerized appliance operated by the user is configured to place voice calls and send IP address data messages;

automatically convert the received one of the telephone number and the IP address to a converted one of a telephone number and an IP address in accordance with a publicly defined protocol standard without querying an external system for the conversion, where the converted one is directly mapped from a telephone number format to an IP address format if the received one is a telephone number and the converted one is directly mapped from an IP address format to a telephone number format if the received one is an IP address;

receive, in the user computerized appliance operated by the user, a user selection of a communication protocol from among a plurality of communication protocols, where a first type of communication protocol from among the plurality of communication protocols corresponds to a the telephone number and a second type of communication protocol from among the plurality of communication protocols corresponds to the IP address;

if the user selection is the first type of communication protocol, initiate in the user computerized appliance operated by the user the first type of communication protocol using the telephone number; and if the user selection is the second type of communication protocol, initiate, in the user computerized appliance operated by the user, the second type of communication protocol using the IP address.

13. The user computerized appliance operated by the user of claim 12, wherein the instructions further cause the processor to:

store the telephone number by the user computerized appliance operated by the user in a first memory location; and store the IP address by the computerized appliance in a second memory location.

14. The user computerized appliance operated by the user of claim 12, wherein the second type of communication protocol is a data communication protocol including a text message.

15. The user computerized appliance operated by the user of claim 14, wherein the user selection is selection of a communication protocol.

16. The user computerized appliance operated by the user of claim 15, wherein the user selection is selection of the IP address.

17. The user computerized appliance operated by the user of claim 12, wherein the second type of communication protocol is a voice-over-IP call.

18. The user computerized appliance operated by the user of claim 12, wherein the telephone number is associated with a plurality of fields provided by the publicly defined protocol standard, wherein the converting includes converting the numbers associated with each field into a hexadecimal notation.

19. The user computerized appliance operated by the user of claim 18, wherein converting includes inserting a leading standardization identifier to the IP address.

20. The user computerized appliance operated by the user of claim 18, wherein the instructions further cause the processor to remove a leading nibble of the converted IP address if the leading nibble does not correspond to a part of a telephone number.

* * * * *

UNITED STATES PATENT AND TRADEMARK OFFICE
CERTIFICATE OF CORRECTION

| | | |
|---|---|---|
| PATENT NO. | : 10,212,288 B2 | Page 1 of 1 |
| APPLICATION NO. | : 14/340481 | |
| DATED | : February 19, 2019 | |
| INVENTOR(S) | : Leonid Nikeyenkov | |

It is certified that error appears in the above-identified patent and that said Letters Patent is hereby corrected as shown below:

In the Claims

Column 9, Line 38, Claim 12  delete "a the telephone number",
  insert --a telephone number--

Signed and Sealed this
Seventh Day of January, 2020

Andrei Iancu
*Director of the United States Patent and Trademark Office*